(12) United States Patent
Nakata

(10) Patent No.: US 12,074,778 B2
(45) Date of Patent: Aug. 27, 2024

(54) BANDWIDTH ESTIMATION DEVICE AND BANDWIDTH ESTIMATION METHOD

(71) Applicant: DENSO CORPORATION, Kariya (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/809,117

(22) Filed: Jun. 27, 2022

(65) Prior Publication Data

US 2022/0417127 A1 Dec. 29, 2022

(30) Foreign Application Priority Data

Jun. 29, 2021 (JP) ................................. 2021-107658

(51) Int. Cl.
*H04L 43/0876* (2022.01)

(52) U.S. Cl.
CPC ................................. *H04L 43/0876* (2013.01)

(58) Field of Classification Search
None
See application file for complete search history.

(56) References Cited

U.S. PATENT DOCUMENTS

| | | | | |
|---|---|---|---|---|
| 2009/0164657 A1* | 6/2009 | Li | .................. | H04L 65/752 709/233 |
| 2016/0094428 A1* | 3/2016 | St-Laurent | .......... | H04L 43/0894 370/253 |
| 2019/0075481 A1 | 3/2019 | Suzuki et al. | | |
| 2020/0313992 A1* | 10/2020 | Sawabe | .................. | H04L 47/283 |
| 2020/0356514 A1* | 11/2020 | Orthner | ............... | G06F 13/4068 |
| 2021/0273889 A1 | 9/2021 | Osuga | | |

FOREIGN PATENT DOCUMENTS

JP 2017184213 A * 5/2017
JP 2017-184213 A 10/2017

* cited by examiner

*Primary Examiner* — Anh Nguyen
(74) *Attorney, Agent, or Firm* — MASCHOFF BRENNAN

(57) ABSTRACT

In a bandwidth estimation device, a measurement unit measures a measurement time from reception by a receiver of a first packet of a packet train including a plurality of packets that are sequentially transmitted from a transmitter via a communication line to reception by the receiver of a last packet of the packet train, An estimation validity determination unit compares the measurement time with a threshold time predefined based on performance of the receiver or characteristics of the communication line to determine whether a valid estimate of an available bandwidth of the communication line can be made. In response to the estimation validity determination unit determining that a valid estimate of the available bandwidth can be made, an estimation unit estimates the available bandwidth of the communication line based on an amount of data in the packet train and the measurement time.

11 Claims, 13 Drawing Sheets

| TRAIN ID | 1 |
|---|---|
| TRANSMISSION TIME | t11 |
| AMOUNT OF DATA IN PACKET | d11 |
| ESTIMATED RATE (ESTIMATE OF AVAILABLE BANDWIDTH) | V1 |

| PACKET NUMBER | 1-1 | ... | 1-4 | 2-1 | ... |
|---|---|---|---|---|---|
| TRAIN ID | 1 | | 1 | 2 | |
| TRANSMISSION TIME | t11 | | t14 | t21 | |
| RECEPTION TIME | r11 | | r14 | r21 | |
| AMOUNT OF DATA | d11 | | d14 | d21 | |

| ENTRY (TRAIN ID) | 1 | 2 | 3 | 4 | ... |
|---|---|---|---|---|---|
| START TIME OF RECEPTION | S1 | S2 | S3 | S4 | |
| END TIME OF RECEPTION | E1 | E2 | E3 | E4 | |
| MEASURED AMOUNT OF DATA | D1 | D2 | D3 | D4 | |

BANDWIDTH ESTIMATION DEVICE AND BANDWIDTH ESTIMATION METHOD

CROSS-REFERENCE TO RELATED APPLICATION

This application is based on and claims the benefit of priority from earlier Japanese patent application No. 2021-107658 filed on Jun. 29, 2021, the description of which is incorporated herein by reference.

BACKGROUND

Technical Field

This disclosure relates to a bandwidth estimation device and a bandwidth estimation method.

Related Art

Conventionally, there are techniques for estimating an available bandwidth in a communication network between a transmitter and a receiver. For example, to measure the available bandwidth between terminals in a communication network, a system for measuring the available bandwidth has been proposed that appropriately adjusts the number of test packets transmitted from a transmitting terminal. In this system, a receiving terminal performs reception processing of test packets received from the transmitting terminal via the communication network and records reception times of the respective test packets based on the reception processing. Based on the reception times and the transmission times of the respective test packets, the receiving terminal calculates an index value representing the magnitude of variation in transmission delay time for each test packet, and determines test packets having reception times delayed to a certain level or higher due to reception processing based on the index values. The receiving terminal then provides an instruction to the transmitting terminal to adjust the number of test packets to be transmitted by the transmitting terminal based on the number of remaining test packets other than the test packets determined to have reception times delayed to a certain level or higher.

_2

Figure 3:
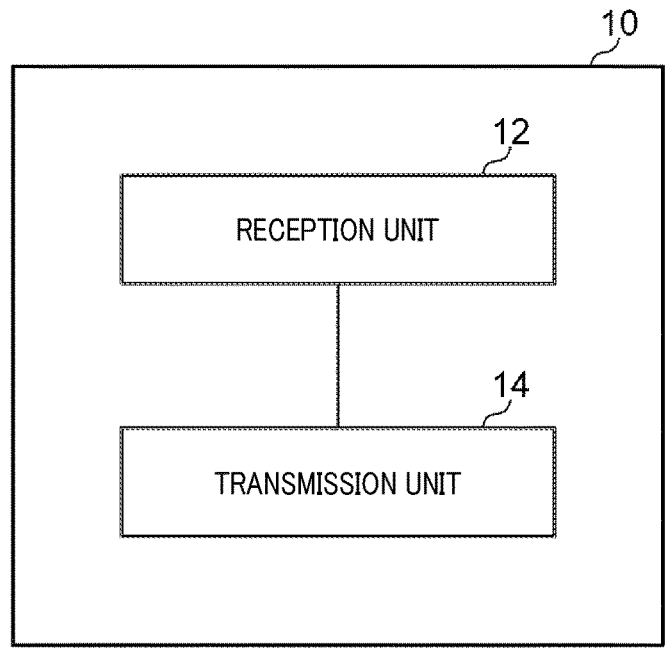
Figure 4:
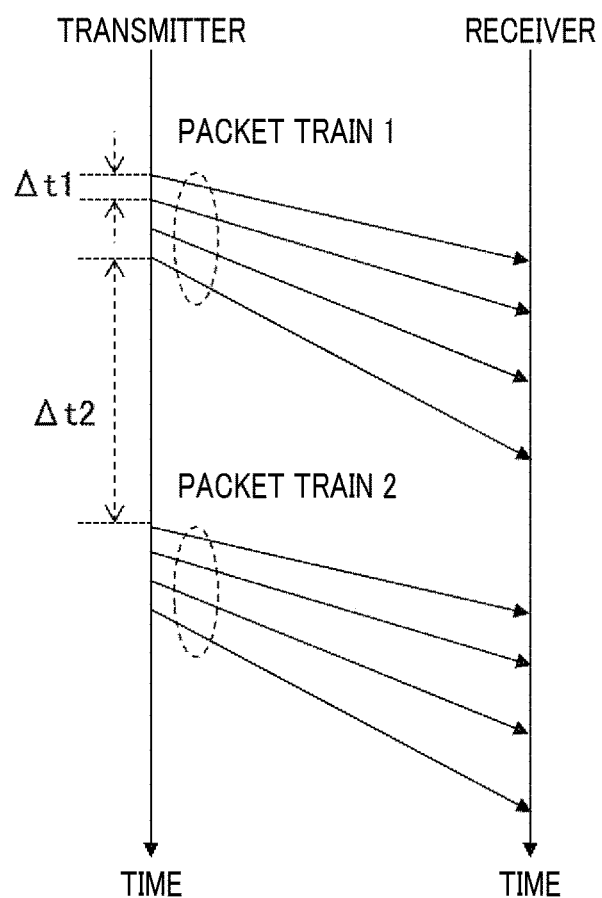
Figure 5:
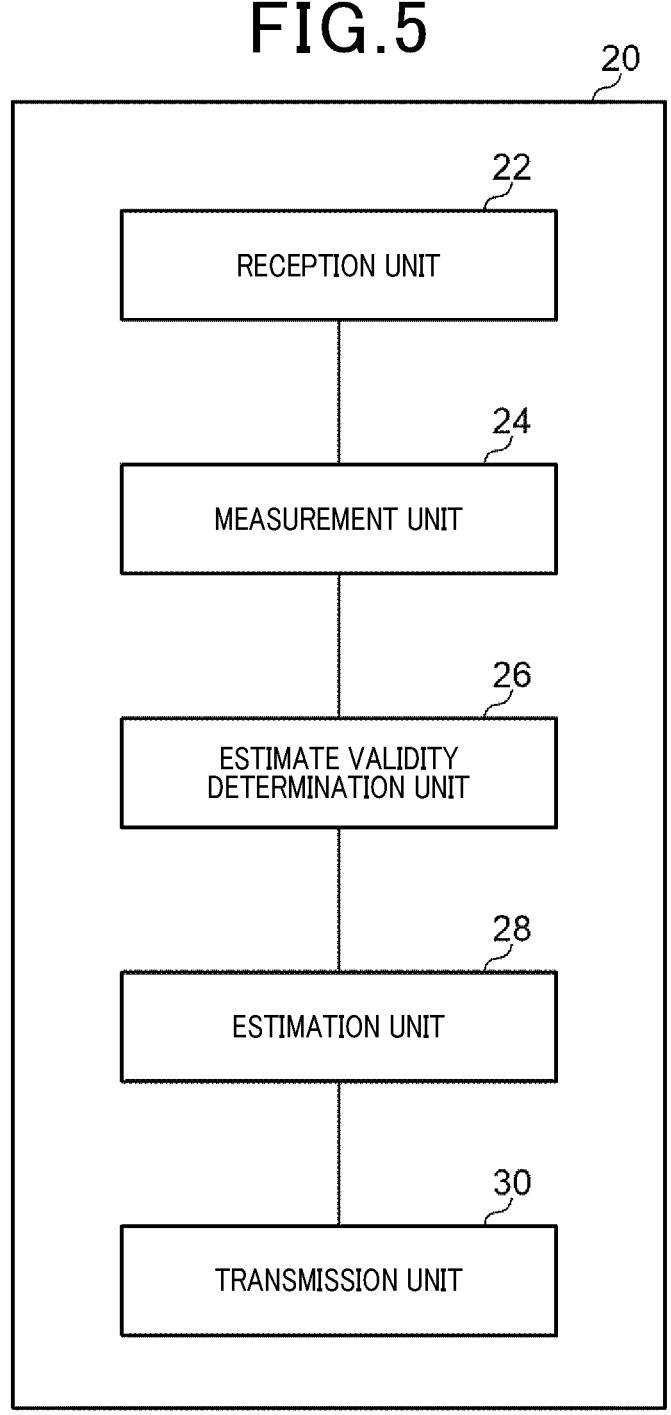
Figure 6:
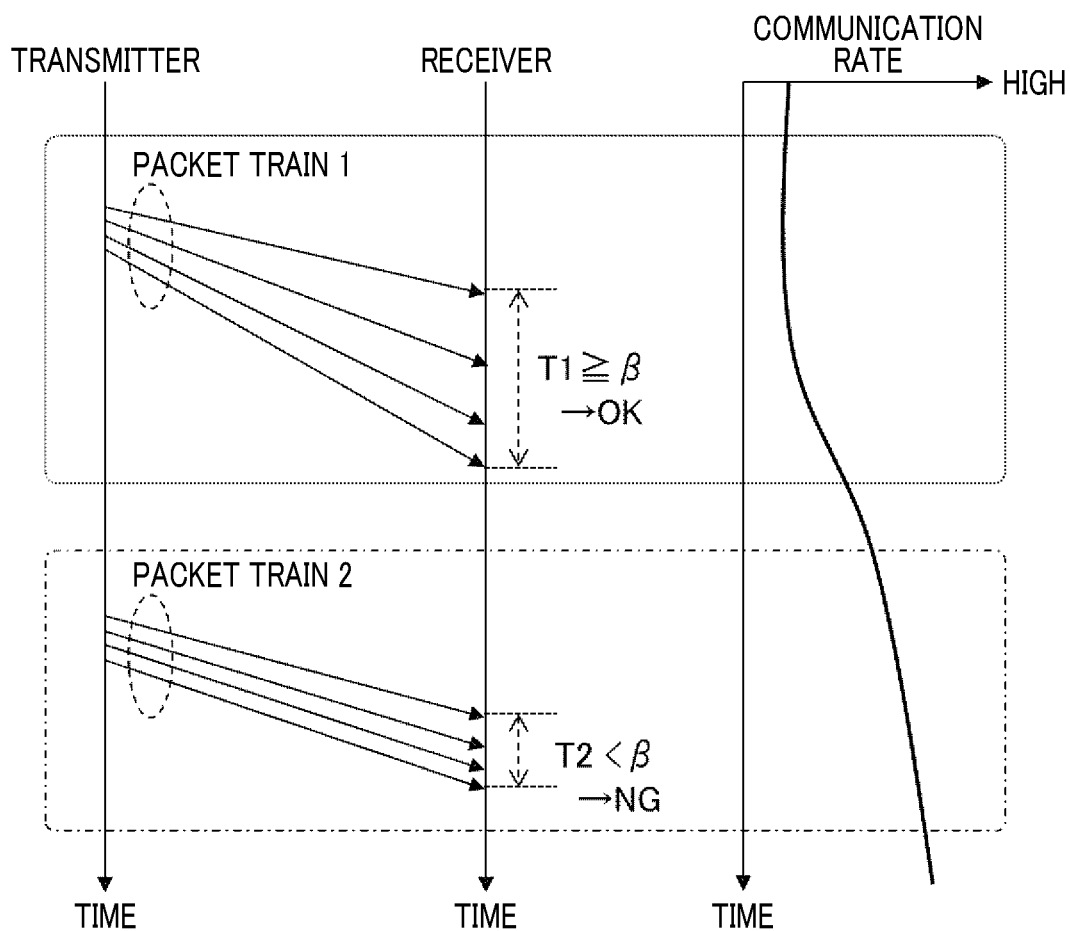
Figure 7:
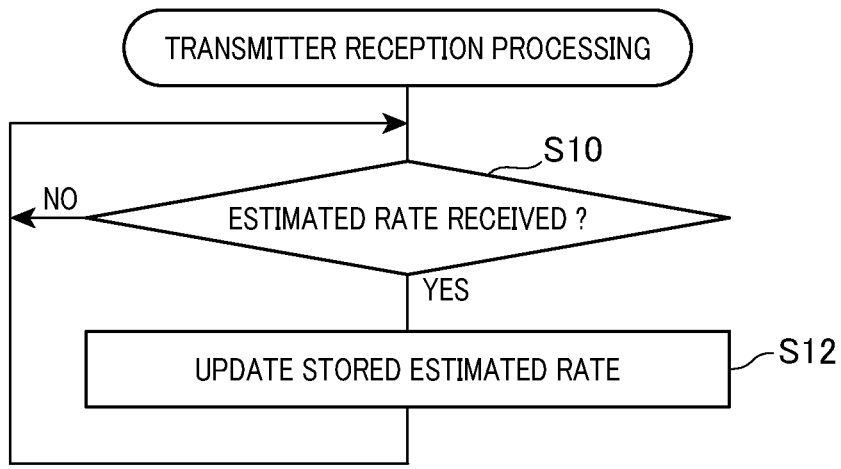
Figure 8:
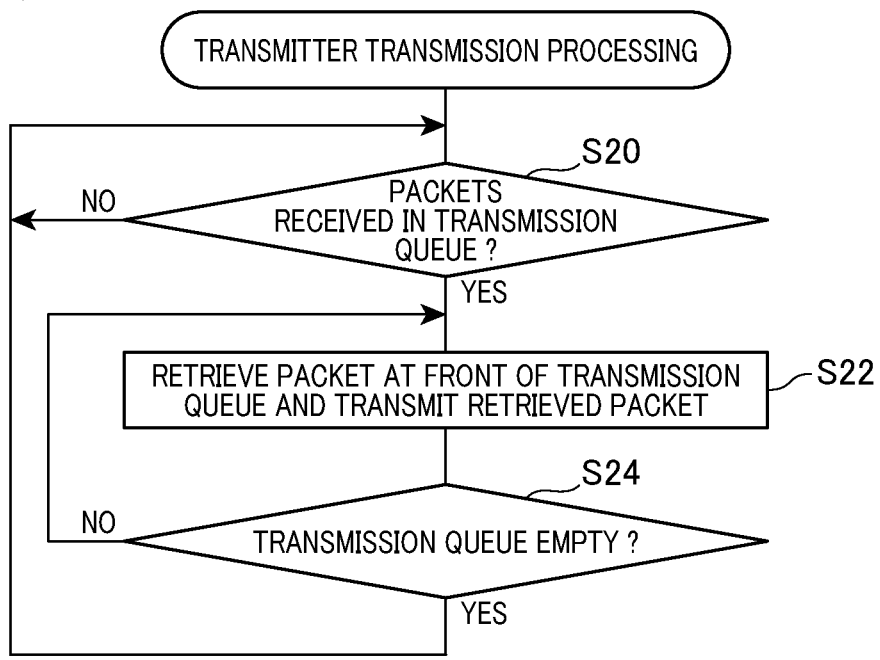
Figure 9:
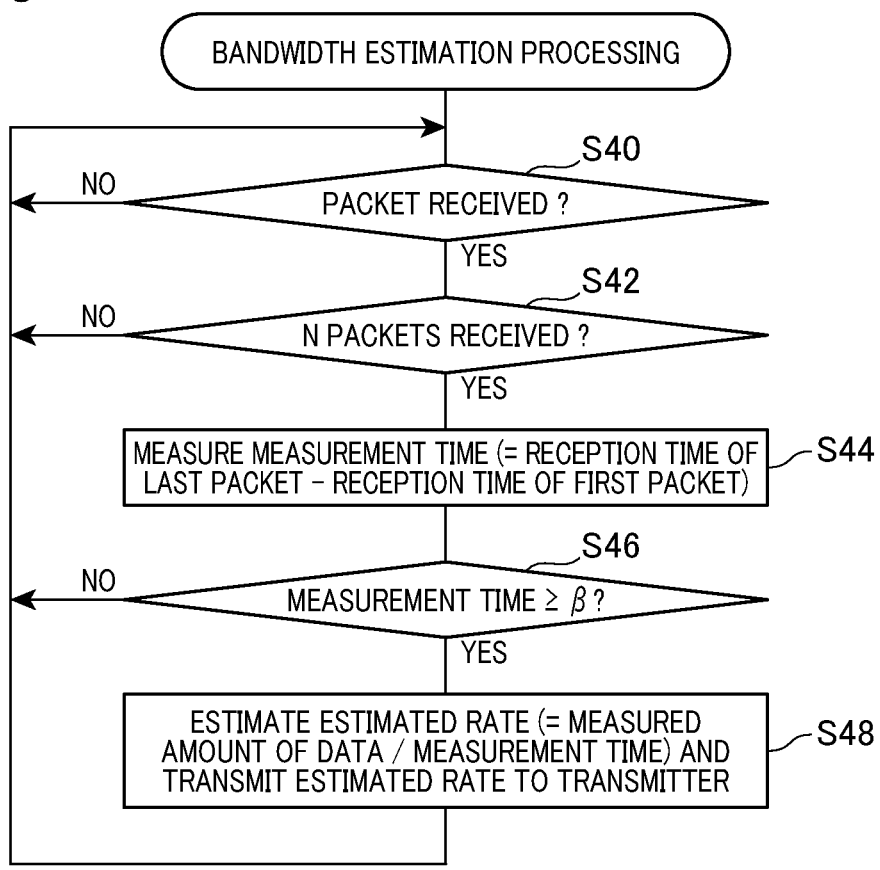
Figures 10, 11:
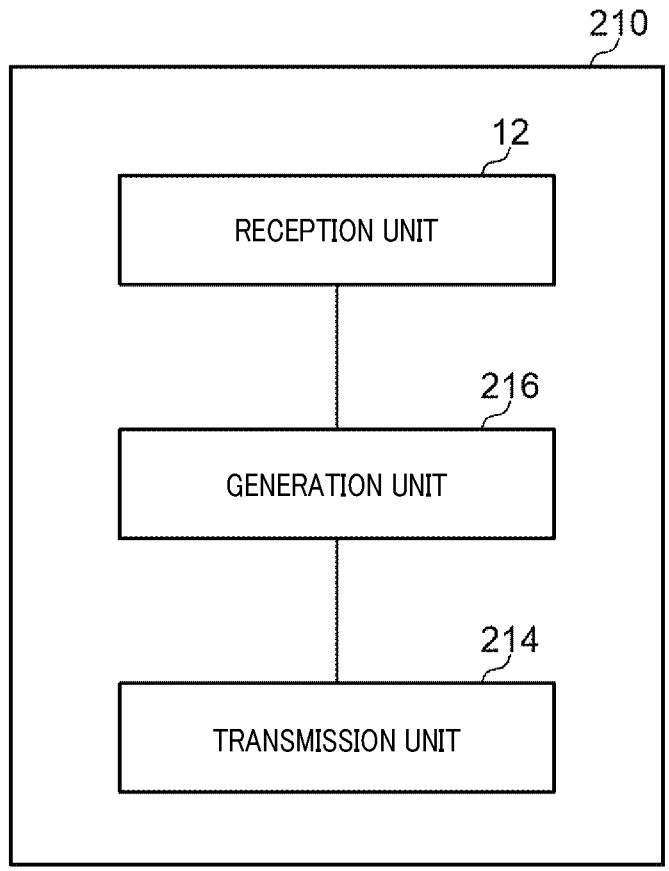
Figures 12, 13:
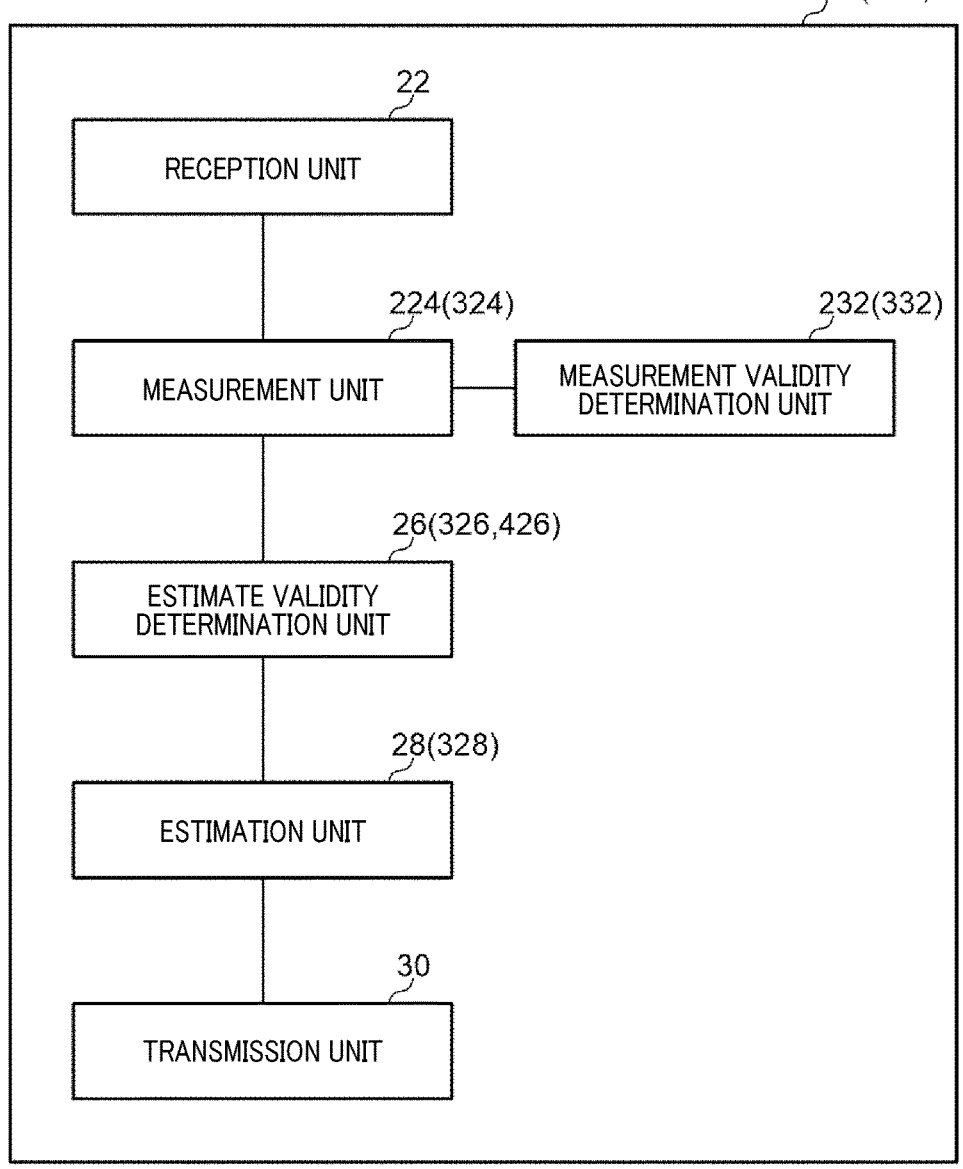
Figure 14:
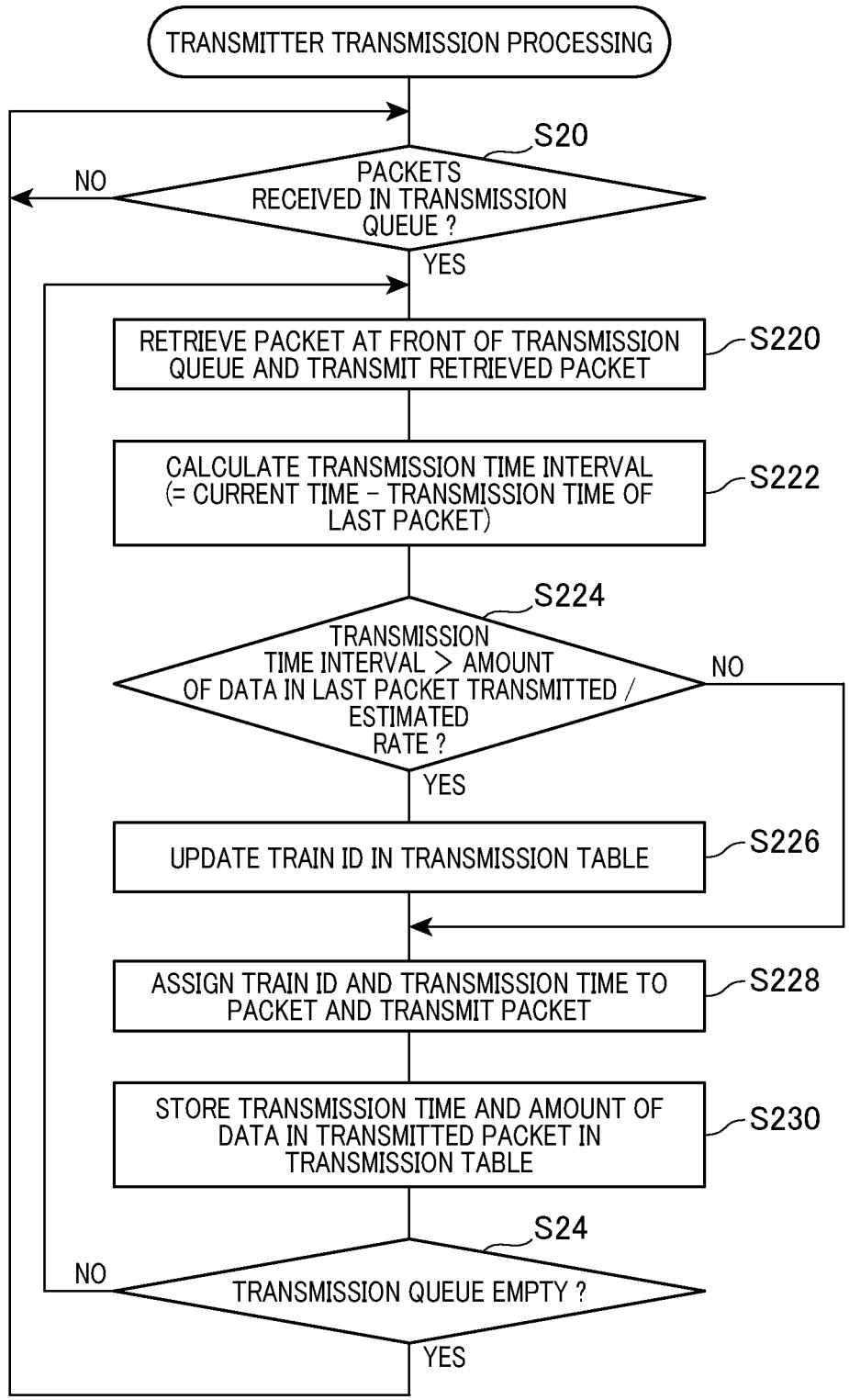
Figures 15, 16:
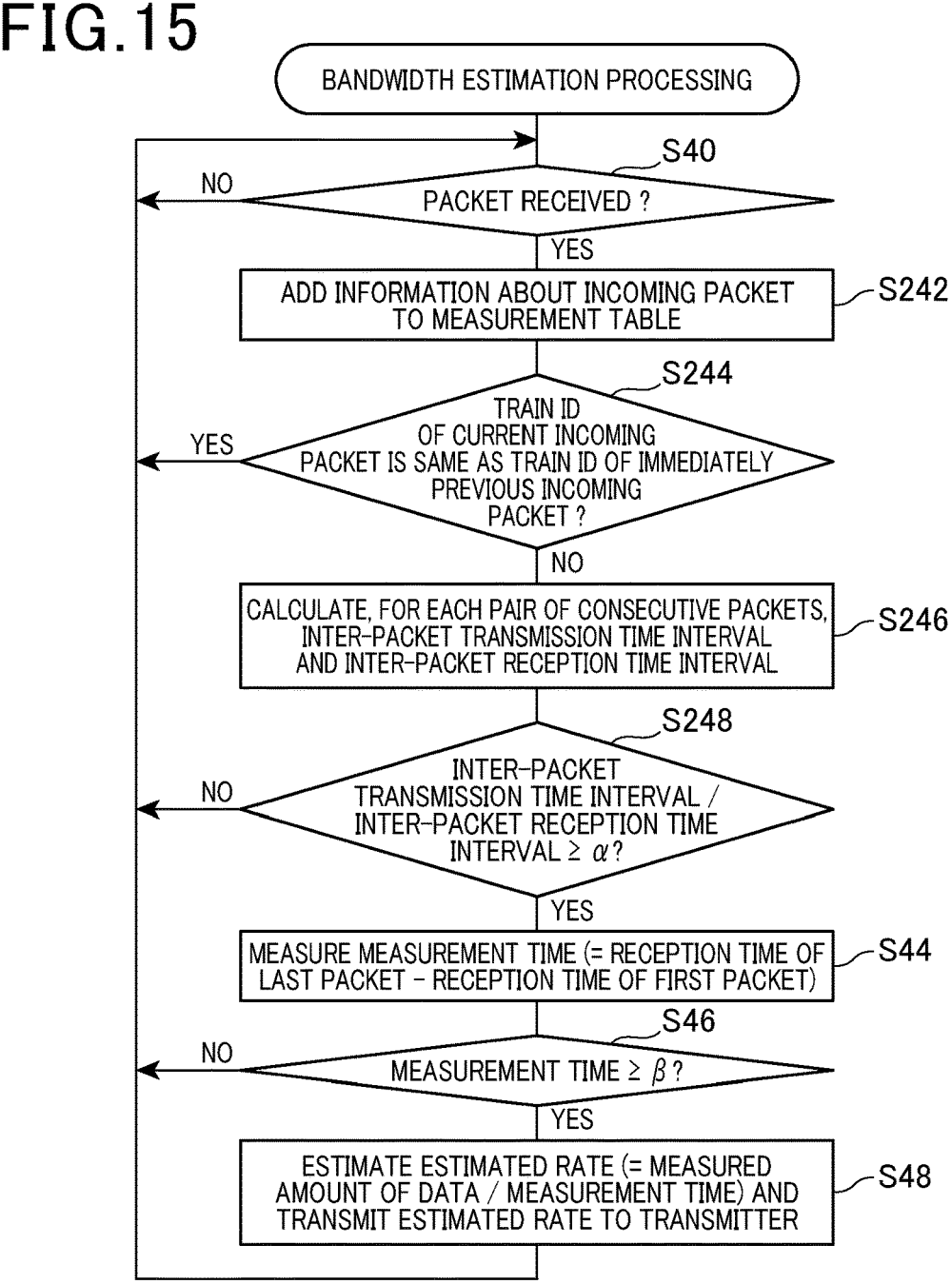
Figure 17:
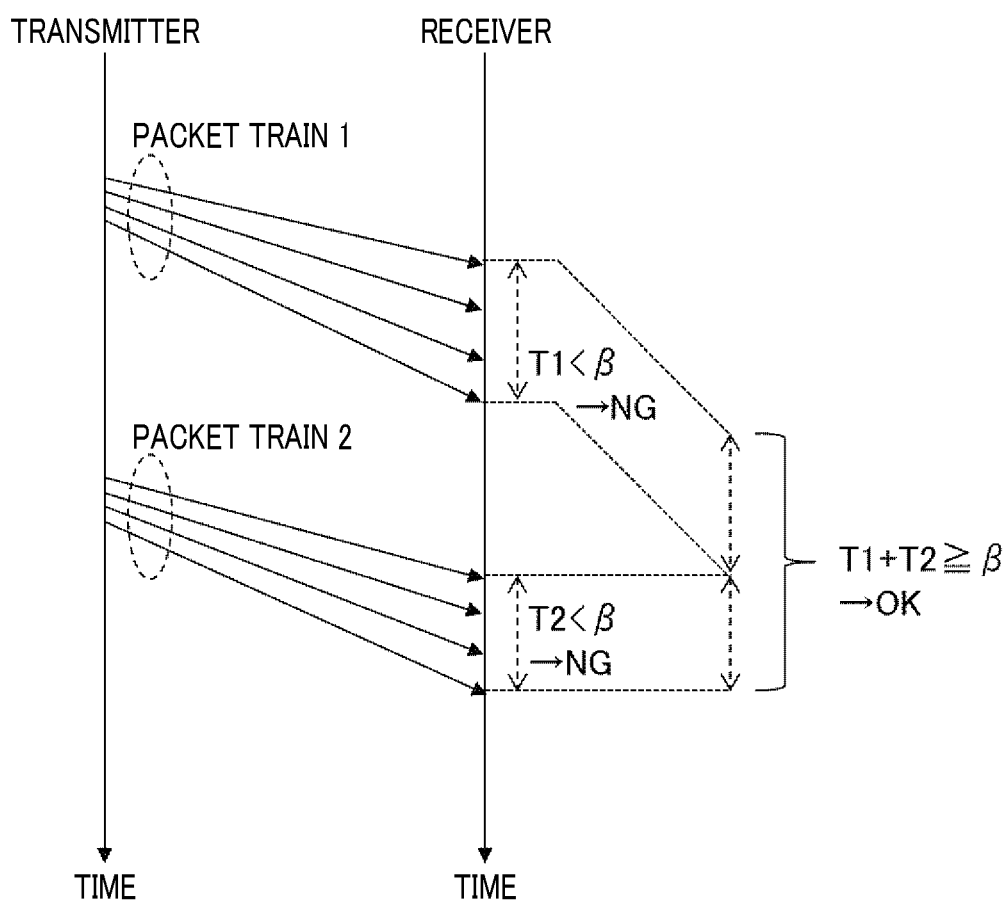
Figure 18:
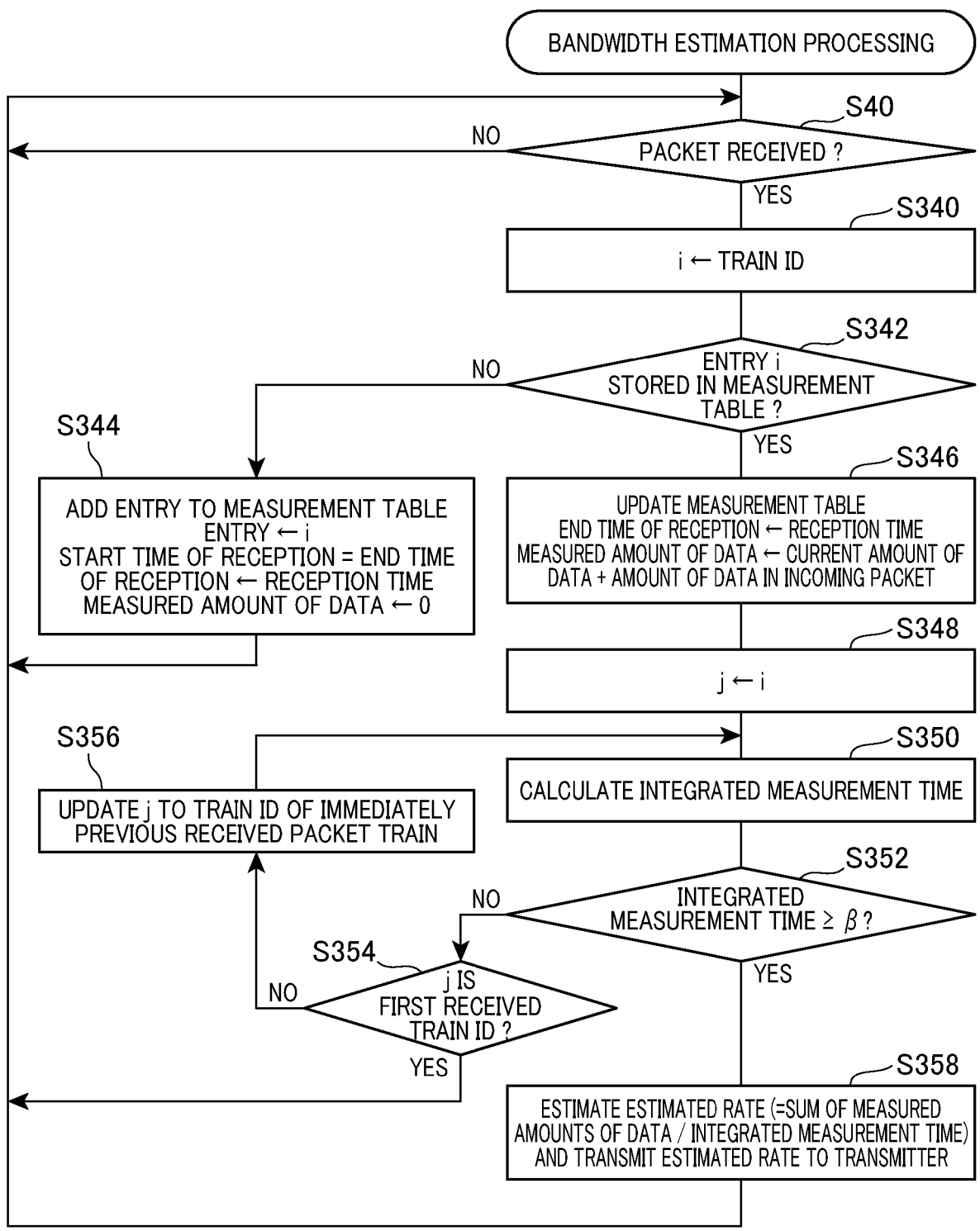
Figure 19:
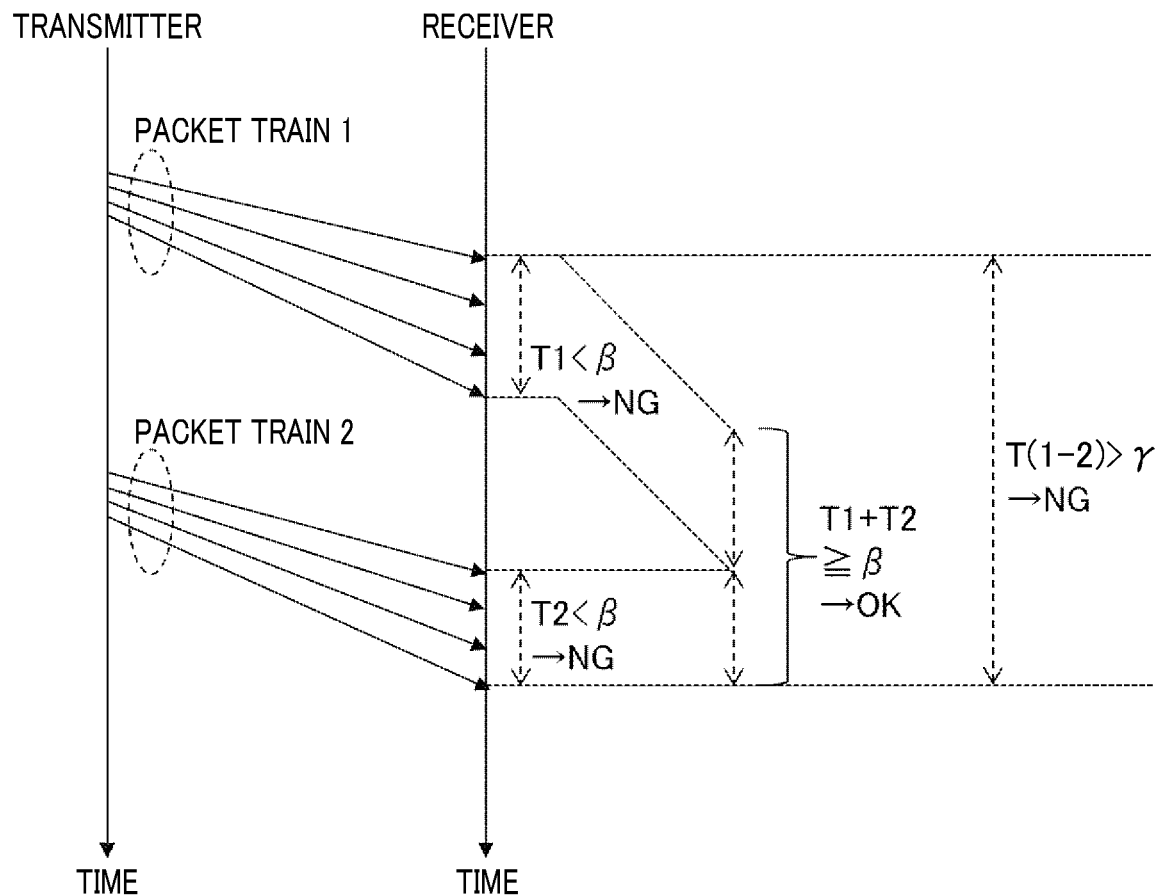
Figure 20:
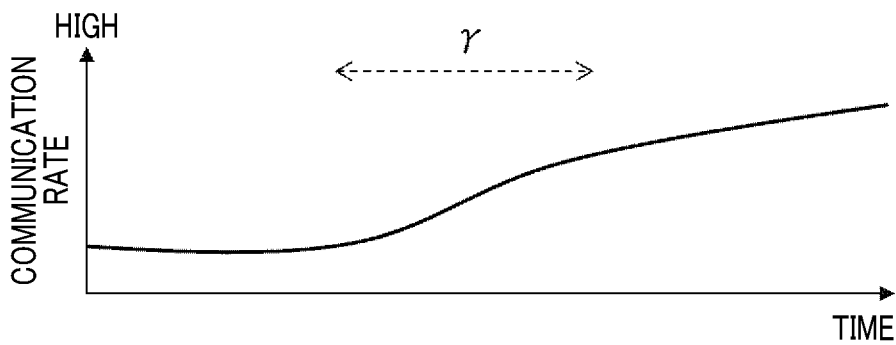
Figure 21:
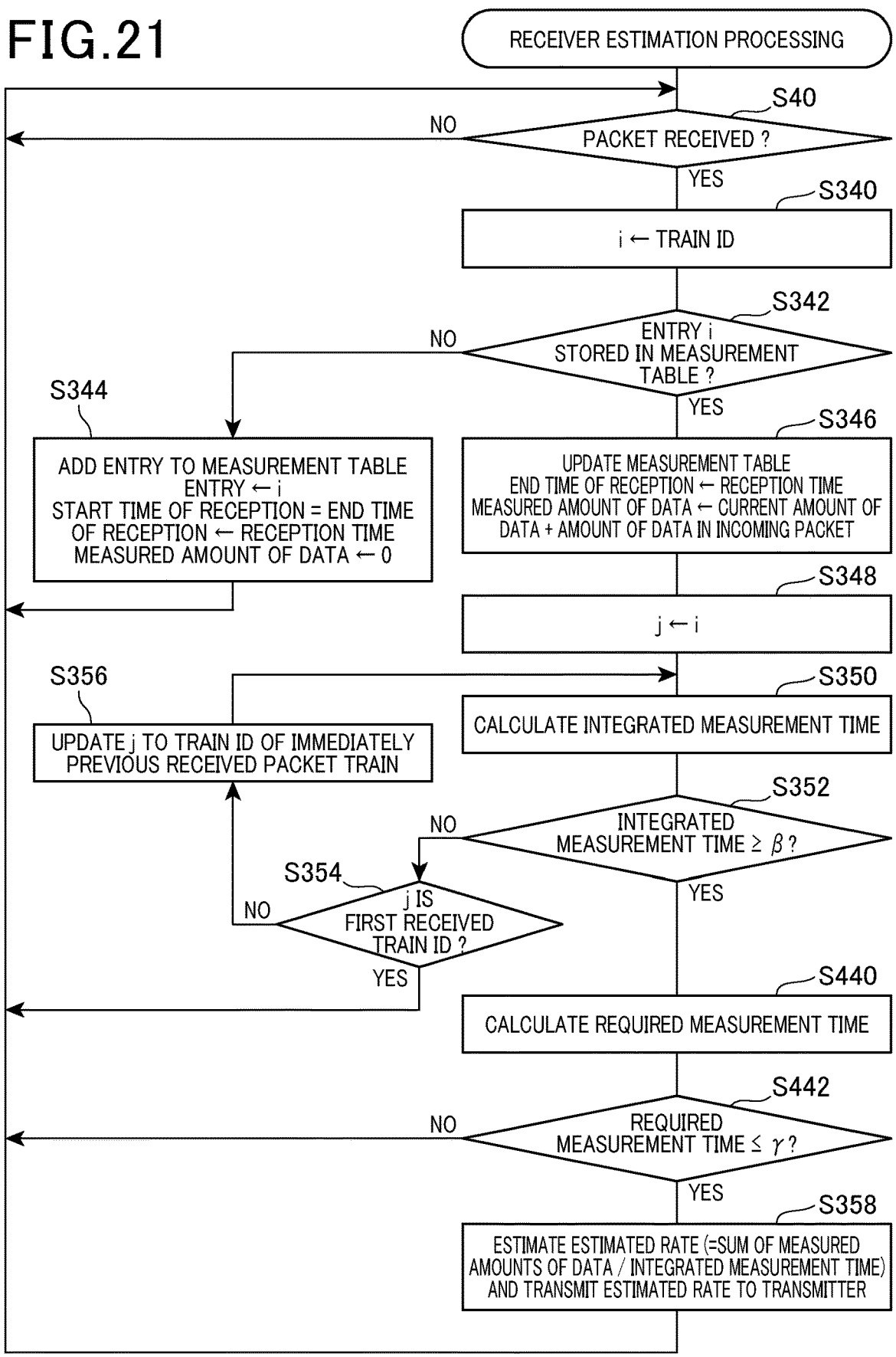

FIG. 3 is a functional block diagram of the transmitter according to the first embodiment;

FIG. 4 is an illustration of transmission and reception of packet trains;

FIG. 5 is a functional block diagram of the receiver according to the first embodiment;

FIG. 6 is an illustration of a spread of reception time intervals depending on a communication rate;

FIG. 7 is a flowchart illustrating an example of transmitter reception processing;

FIG. 8 is a flowchart illustrating an example of transmitter transmission processing according to the first embodiment;

FIG. 9 is a flowchart illustrating an example of bandwidth estimation processing according to the first embodiment;

FIG. 10 is a functional block diagram of a transmitter according to a second embodiment;

FIG. 11 is an illustration of an example of a transmission table;

FIG. 12 is a functional block diagram of a receiver according to each of second to fourth embodiments;

FIG. 13 is an illustration of an example of a measurement table according to the second embodiment;

FIG. 14 is a flowchart illustrating an example of transmitter transmission processing according to the second embodiment;

FIG. 15 is a flowchart illustrating an example of bandwidth estimation processing according to the second embodiment;

FIG. 16 is an illustration of an example of a measurement table according to a third embodiment;

FIG. 17 is an illustration of consolidation of packet trains;

FIG. 18 is a flowchart illustrating an example of bandwidth estimation processing according to the third embodiment;

FIG. 19 is an illustration of an upper limit for an integrated packet train;

FIG. 20 is an illustration of an example of setting an upper limit for a required measurement time; and FIG. 21 is a flowchart illustrating an example of bandwidth estimation processing according to a fourth embodiment.

DESCRIPTION OF SPECIFIC EMBODIMENTS

In the above technique as disclosed in JP 2017-184213 A, the number of test packets is adjusted to maintain the number of test packets required for estimating the available bandwidth with test packets having reception times delayed to a certain level or higher due to reception processing excluded. Thus, there is an issue with the technique disclosed in JP 2017-184213 A that the higher the incidence of delays above a certain level due to reception processing, the more test packets need to be added, and as the number of test packets increases, the communication data amount and the processing load for bandwidth estimation increase.

In view of the foregoing, it is desired to have a technique for making a valid estimate of a bandwidth while suppressing increases in communication data amount and processing load.

A first aspect of the present disclosure provides a bandwidth estimation device including: a measurement unit configured to measure a measurement time from reception by a receiver of a first packet of a packet train including a plurality of packets that are sequentially transmitted from a transmitter via a communication line to reception by the receiver of a last packet of the packet train; an estimation validity determination unit configured to compare the measurement time with a threshold time predefined based on performance of the receiver or characteristics of the communication line to determine whether a valid estimate of an available bandwidth of the communication line can be made; and an estimation unit configured to, in response to the estimation validity determination unit determining that a valid estimate of the available bandwidth can be made, estimate the available bandwidth of the communication line based on an amount of data in the packet train and the measurement time.

A second aspect of the present disclosure provides a bandwidth estimation method includes: a measurement unit measuring a measurement time from reception by a receiver of a first packet of a packet train including a plurality of packets that are sequentially transmitted from a transmitter via a communication line to reception by the receiver of a last packet of the packet train; an estimation validity determination unit comparing the measurement time with a threshold time predefined based on performance of the receiver or characteristics of the communication line to determine whether a valid estimate of an available bandwidth of the communication line can be made; and in response to the estimation validity determination unit determining that a valid estimate of the available bandwidth can be made, an estimation unit estimating the available bandwidth of the communication line based on an amount of data in the packet train and the measurement time.

A third aspect of the present disclosure provides a non-transitory computer readable storage medium having instructions stored thereon that, when executed by a computer, cause the computer to function as: a measurement unit configured to measure a measurement time from reception by a receiver of a first packet of a packet train including a plurality of packets that are sequentially transmitted from a transmitter via a communication line to reception by the receiver of a last packet of the packet train; an estimation validity determination unit configured to compare the measurement time with a threshold time predefined based on performance of the receiver or characteristics of the communication line to determine whether a valid estimate of an available bandwidth of the communication line can be made; and an estimation unit configured to, in response to the estimation validity determination unit determining that a valid estimate of the available bandwidth can be made, estimate the available bandwidth of the communication line based on an amount of data in the packet train and the measurement time.

The bandwidth estimation device, method, and non-transitory computer-readable storage medium of the present disclosure can make a valid estimate of a bandwidth while suppressing increases in communication data amount and processing load.

With reference to the accompanying drawings, hereinafter are described several embodiments of the present disclosure.

First Embodiment

Figure 1:
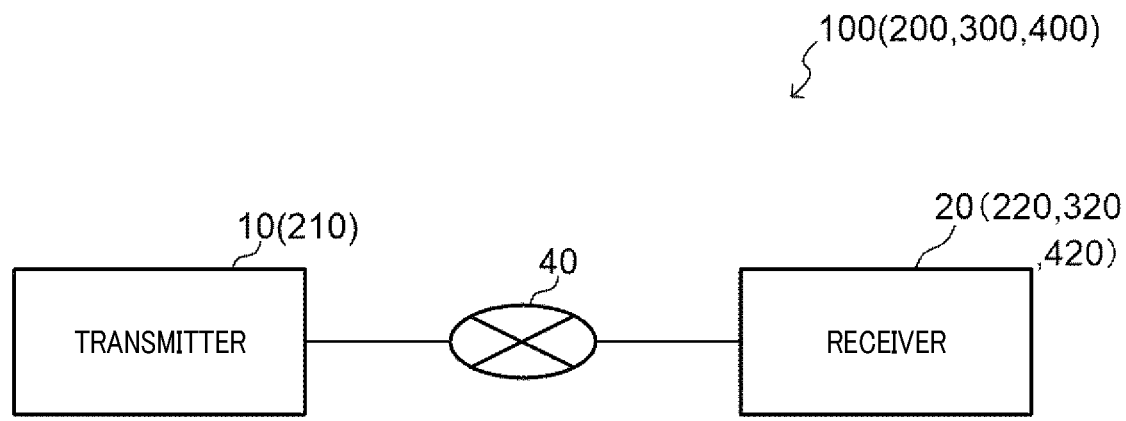
FIG. 1 is a schematic block diagram of a bandwidth estimation system.

As illustrated in FIG. 1, a bandwidth estimation system 100 according to a first embodiment includes a transmitter 10 and a receiver 20. The transmitter 10 and the receiver 20 are connected via a communication line 40 and mutually transmit and receive packets. Each of the number of the transmitters 10 included in the bandwidth estimation system 100 and the number of the receivers 20 included in the bandwidth estimation system 100 is not limited to one as in the example of FIG. 1, but may be greater than one.

Figure 2:
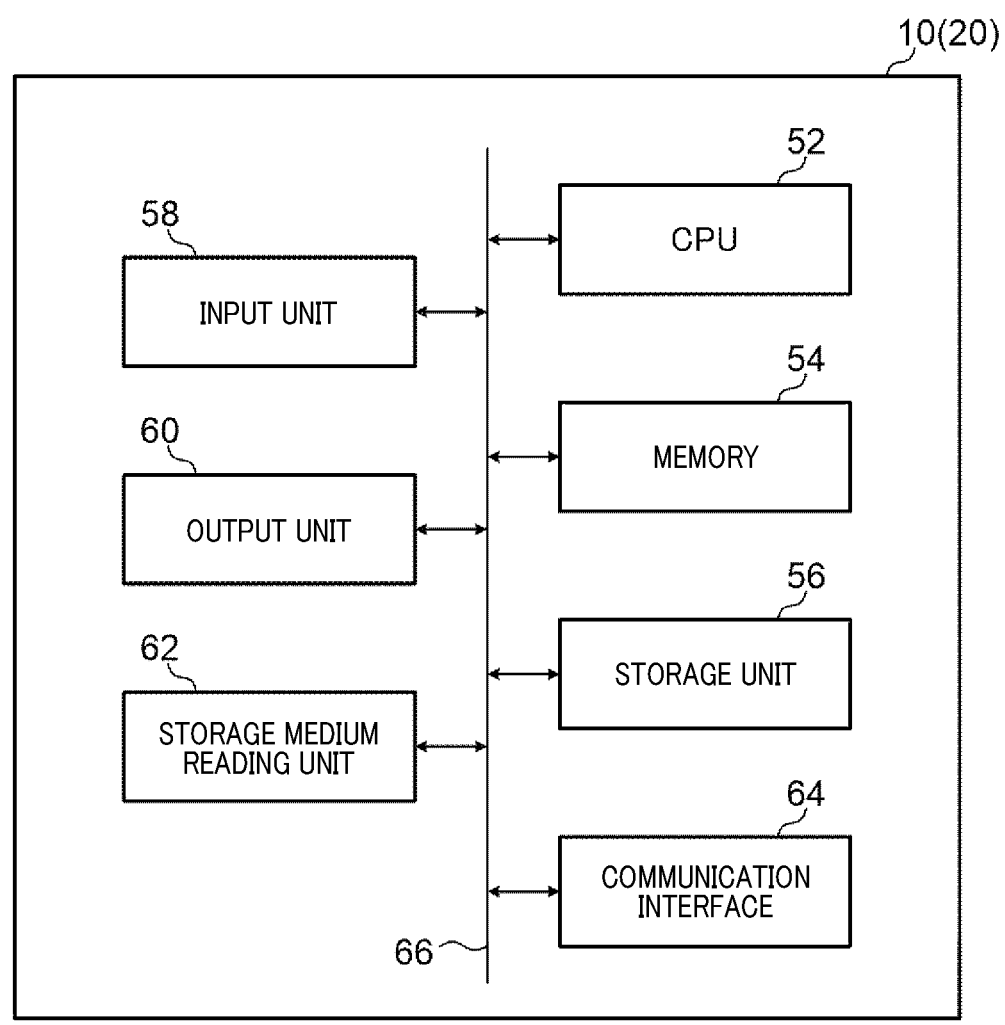
FIG. 2 is a block diagram of a hardware configuration of a transmitter/receiver.

FIG. 2 illustrates a hardware configuration of the transmitter 10. As illustrated in FIG. 2, the transmitter 10 includes a Central Processing Unit (CPU) 52, a memory 54, a storage unit 56, an input unit 58, an output unit 60, a storage medium reading unit 62, and a communication interface (I/F) 64. These components are communicably connected to each other via a bus 66.

The storage unit 56 stores transmitter-side programs for executing transmitter reception processing and transmitter transmission processing that will be described later. The CPU 52 is a central processing unit that executes various programs and controls each component. That is, the CPU 52 reads programs from the storage unit 56 and executes the programs using the memory 54 as a workspace. The CPU 52 controls each of the above components and performs various arithmetic operations according to the programs stored in the storage unit 56.

The memory 54 is formed of a Random Access Memory (RAM) to temporarily store programs and data as a workspace. The storage unit 56 is formed of a Read Only Memory (ROM), a Hard Disk Drive (HDD), a Solid State Drive (SSD), or the like, to store various programs, including an operating system, and a variety of data.

The input unit 58 is a unit for performing a variety of input, such as a keyboard, a mouse or the like. The output unit 60 is a unit for outputting a variety of information, such as a display, a printer or the like. A touch panel display may be employed as the output unit 60 to function as the input unit 58.

The storage medium reading unit 62 is configured to read data from or write data into various types of storage media, such as a Compact Disc (CD)-ROM, a Digital Versatile Disc (DVD)-ROM, a Blu-ray Disc, a Universal Serial Bus (USB)-memory, and other storage media. The communication I/F 64 is an interface for communicating with other devices including the receiver 20, using standards such as Ethernet™, FDDI, Wi-Fi™ or the like.

As the hardware configuration of the receiver 20 is substantially the same as that of the transmitter 10 illustrated in FIG. 2, description thereof will be omitted. The storage unit 56 of the receiver 20 has a bandwidth estimation program stored for performing bandwidth estimation processing described later.

A functional configuration of the transmitter 10 of the first embodiment will now be described with reference to FIG. 3. As illustrated in FIG. 3, the transmitter 10 includes a reception unit 12 and a transmission unit 14. Each functional block is implemented by the CPU 52 illustrated in FIG. 2.

The reception unit 12 receives an available bandwidth estimate transmitted from the receiver 20. The available bandwidth estimate is a data transfer amount per unit time, i.e., a rate of communication. Hereafter, the available bandwidth estimate is also referred to as a rate estimate. The reception unit 12 notifies the transmission unit 14 of the received rate estimate.

The transmission unit 14 sequentially transmits a packet train including a plurality of packets to the receiver 20 via the communication line 40. The number of packets included in the packet train may be a predefined number, or it may be a dynamically changing number depending on the rate estimate, a packet data amount, or the like. In the first embodiment, the transmission unit 14 is configured to transmit a packet train including N packets, where N is a predefined number.

Specifically, as illustrated in FIG. 4, the transmission unit 14 sequentially transmits N packets at predefined time intervals $\Delta t1$ (where N=4 in the example in FIG. 4), thereby transmitting one packet train. The time interval $\Delta t1$ is set such that the packets are transmitted sequentially at a higher rate than the communication rate at which packets are to be transmitted over the communication line 40. The communication rate may be the rate estimate notified by the reception unit 12.

In addition, when a predefined time interval $\Delta t1$ ($\Delta t2 > \Delta t1$) or more has elapsed from transmission of the last packet of a packet train, the transmission unit 14 transmits a subsequent packet train. In FIG. 4, each packet transmitted from the transmitter 10 to the receiver 20 is indicated by a solid arrow with the start point of the arrow mapped to the time axis representing the transmission time at the transmitter 10 and the end point of the arrow mapped to the time axis representing the reception time at the receiver 20. The same is applied in FIGS. 6, 17, and 19 described later.

A functional configuration of the receiver 20 of the first embodiment will now be described with reference to FIG. 5. As illustrated in FIG. 5, the receiver 20 includes a reception unit 22, a measurement unit 24, an estimate validity determination unit 26, an estimation unit 28, and a transmission unit 30. Each functional block may be implemented by the CPU 52 illustrated in FIG. 2.

The reception unit 22 receives packets transmitted sequentially from the transmitter 10 via the communication line 40. The reception unit 22 passes the received packets, along with the reception times of the respective packets, to the measurement unit 24.

Each time a packet train is received by the reception unit 22, that is, each time N consecutive packets are received, the measurement unit 24 measures a measurement time that is a time period from reception of the first packet of the packet train to reception of the last packet of the same packet train. The measurement unit 24 passes the measured measurement time to the estimate validity determination unit 26, and a data amount for each packet included in the packet train to the estimation unit 28.

As described above, transmitting packets at a rate higher than the communication rate of the communication line 40 allows a packet train transmitted from the transmitter 10 to be received by the receiver 20 with a spread of reception time intervals depending on the communication rate of the communication line 40 as illustrated in FIG. 6. That is, even if the packet trains are transmitted at equal transmission time intervals, the measurement time at the receiver 20 differs with the communication rate. In the example illustrated in FIG. 6, the measurement time T1 for the packet train 1 transmitted during a period of low communication rate (indicated by the dotted line in FIG. 6) is greater than the measurement time T2 for the packet train 2 transmitted during a period of high communication rate (indicated by the dashed-dotted line in FIG. 6). If a required time according to the performance of the receiver 20 or the characteristics of the communication line 40 is not guaranteed for this measurement time, a valid estimate of the bandwidth cannot be made using the measurement time.

The estimate validity determination unit 26 compares the measurement time received from the measurement unit 24 with a threshold time predefined based on the performance of the receiver 20 or the characteristics of the communication line 40 to determine whether a valid estimate of the available bandwidth can be made.

For example, in a case where the measurement time is greater than or equal to the threshold time $\beta$ that is greater than or equal to a predefined multiple of the resolution of processing time at the receiver 20, the estimate validity determination unit 26 determines that a valid estimate of the available bandwidth can be made. The resolution of processing time is the granularity of time stamps at the receiver 20 (e.g., 10 ms). For example, for the error in bandwidth estimate due to the time resolution to be 10% or less, the threshold time $\beta$ is at least 10 times the time resolution. Alternatively, for example, the estimate validity determination unit 26 may set the threshold time $\beta$ to a time period per interrupt cycle, in which interrupt processing is performed on the packets received at the receiver 20, plus a margin.

The interrupt cycle is preset as the performance of the receiver 20. Still alternatively, for example, the estimate validity determination unit 26 may set the threshold time $\beta$ to a time period per burst cycle, in which burst traffic occurs on the communication line 40, plus a margin. The burst cycle may be preset based on the characteristics of the communication line 40. In these cases as well, in a case where the measurement time is greater than or equal to the threshold time $\beta$, the estimate validity determination unit 26 determines that a valid estimate of the available bandwidth can be made.

In the example of FIG. 6, T1$\geq\beta$ and T2$<\beta$. Therefore, the estimate of the bandwidth using the packet train 1 is determined to be valid (OK), and the estimate of the bandwidth using the packet train 2 is invalid (NG). The estimate validity determination unit 26 passes the measurement time for which it is determined that a valid estimate of the available bandwidth can be made to the estimation unit 28.

The estimation unit 28 estimates the available bandwidth of the communication line 40 based on the measurement time received from the estimate validity determination unit 26 and the amount of data in each of the packets included in the packet train received from the measurement unit 24. Specifically, the estimation unit 28 estimates the available bandwidth of the communication line 40 by dividing a sum of amounts of data in the packets other than the first packet in the packet train (i.e., the second to the Nth packets) (hereinafter referred to as a measured data amount) by the measurement time. The estimation unit 28 passes the estimate of the available bandwidth to the transmission unit 30.

The transmission unit 30 transmits the available bandwidth estimate received from the estimation unit 28 to the transmission unit 10 that is a source of the packet train.

Operations of the bandwidth estimation system 100 of the first embodiment will now be described. In the transmitter 10, transmitter reception processing illustrated in FIG. 7 and transmitter transmission processing illustrated in FIG. 8 are performed. In the receiver 20, bandwidth estimation processing illustrated in FIG. 9 is performed. The bandwidth estimation processing is an example of the bandwidth estimation method.

The transmitter reception processing will now be described with reference to FIG. 7.

At step S10, the reception unit 12 determines whether the rate estimate transmitted from the receiver 20 has been received. If the rate estimate has not been received, the reception unit 12 repeats the determination step S10. If the rate estimate transmitted has been received, the process flow proceeds to step S12. At step S12, the reception unit 12 updates the rate estimate stored in a predefined storage area to the rate estimate received at step S10. The process flow returns to step S10.

The transmitter transmission processing will now be described with reference to FIG. 8.

At step S20, the transmission unit 14 determines whether packets have arrived in a transmission queue of the transmitter 10. If packets have not arrived in the transmission queue, the transmission unit 14 repeats the determination step S20. If packets have arrived in the transmission queue, the process flow proceeds to step S22. At step S22, the transmission unit 14 retrieves the packet at the front of the transmission queue and determines the transmission timing based on the rate estimate stored in the predefined storage area. Then, the transmission unit 14 transmits the retrieved packet to the receiver 20 at the determined transmission timing.

Subsequently, at step S24, the transmission unit 14 determines whether the transmission queue is empty. If the transmission queue is empty, the process flow returns to step S20. If the transmission queue is not empty, the process flow returns to step S22.

Bandwidth estimation processing will now be described with reference to FIG. 9.

At step S40, the reception unit 22 determines whether a packet transmitted by the transmitter 10 has been received. If a packet transmitted by the transmitter 10 has been received, the process flow proceeds to step S42. If no packet transmitted by the transmitter 10 has been received, the reception unit 22 repeats the determination step S40. At step S42, the measurement unit 24 determines whether N packets have been received, where the N packets are formed of first to N-th packets with the first packet being the packet subsequent to the last packet in the immediately previous received packet train, thereby determining whether one packet train has been received. If one packet train has been received, the process flow proceeds to step S44. If the number of packets that have been received is less than N, that is, if only some of the N packets forming one packet train have been received, the process flow returns to step S40.

At step S44, the measurement unit 24 subtracts the reception time of the first packet from the reception time of the last packet in the packet train to measure a measurement time. Subsequently, at step S46, the estimate validity determination unit 26 determines whether the measurement time measured at step S44 is greater than or equal to a threshold time β predefined based on the performance of the receiver 20 or the characteristics of the communication line 40. If the measurement time≥β, the estimate validity determination unit 26 determines that the measurement time can be used to make a valid estimate of the bandwidth, and the process flow proceeds to step S48. If the measurement time<β, the estimate validity determination unit 26 determines that a valid estimate of the bandwidth cannot be made using the measurement time. The process flow then returns to step S48.

At step S48, the estimation unit 28 estimates an available bandwidth by dividing the measured amount of data in the packet train received at steps S40 and S42 by the measurement time measured at step S44. Then, the transmission unit 30 transmits the rate estimate, i.e., the available bandwidth estimate (that is the rate estimate), to the transmission unit 10. Then, the process flow returns to step S40.

As described above, in the bandwidth estimation system of the first embodiment, the receiver measures a measurement time from reception of the first packet of a packet train transmitted from the transmitter via the communication line to the reception of the last packet of the packet train. The receiver then compares the measurement time with a threshold time predefined based on the performance of the receiver or the characteristics of the communication line to determine whether a valid estimate of the available bandwidth can be made. In response to determining that a valid estimate of the available bandwidth can be made, the receiver estimates the available bandwidth of the communication line based on an amount of data in the packet train and the measurement time. This excludes cases where a valid estimate cannot be made due to environmental changes, such as higher communication rate of the communication line, and allows a valid estimate to be made only when the measurement time that allows for a valid estimate is ensured. Therefore, a valid estimate of the bandwidth can be made while suppressing increases in communication data amount and processing load. In addition, using a threshold time predefined based on the performance of the receiver or the characteristics of the communication line can suppress erroneous estimates that may occur due to the performance deficiency of the receiver or environmental changes of the communication line.

Second Embodiment

A second embodiment will now be described. In the bandwidth estimation system of the second embodiment, components similar to those of the bandwidth estimation system 100 of the first embodiment are assigned with the same reference numerals and detailed description thereof will be omitted. For the functional blocks whose last two digits of the reference numerals are common between the first and second embodiments, detailed description will be omitted. The hardware configuration of each of the transmitter and the receiver of the second embodiment is the same as that of each of the transmitter 10 and receiver 20 of the first embodiment as illustrated in FIG. 2. Detailed description thereof will thus be omitted.

As illustrated in FIG. 1, the bandwidth estimation system 200 according to the second embodiment includes a transmitter 210 and a receiver 220.

A functional configuration of the transmitter 210 of the second embodiment will now be described with reference to FIG. 10. As illustrated in FIG. 10, the transmitter 210 includes the reception unit 12, a generation unit 216, and a transmission unit 214. Each functional block is implemented by the CPU 52 illustrated in FIG. 2.

The generation unit 216 generates a packet train including a plurality of packets based on transmission time intervals. Specifically, the generation unit 216 sequentially retrieves a packet that has arrived in the transmission queue, and determines a train ID that is identification information of the packet train to which the retrieved packet belongs. In response to the transmission time interval that is a time between the transmission time of the last packet and the current time being greater than a predefined value, the generation unit 216 determines a new train ID. In response to the transmission time interval being less than or equal to the predefined value, the generation unit 216 determines the same train ID as the train ID assigned to the last transmitted packet. The predefined value may be, for example, a value acquired by dividing an amount of data in the last transmitted packet by the rate estimate.

For example, the generation unit 216 stores the determined train ID in a transmission table as illustrated in FIG. 11. Specifically, upon determining a new train ID, the generation unit 216 updates the train ID in the transmission table with the new train ID. In the example illustrated in FIG. 11, in addition to the train ID, the transmission table further stores the transmission time, the amount of data in the packet, and the rate estimate that is an estimate of the available bandwidth. The transmission time and the amount of data in the packet will be described later. The rate estimate is stored by the reception unit 12 upon the reception unit 12 receiving the rate estimate from the receiver 20. The generation unit 216 passes the retrieved packet to the transmission unit 214.

The transmission unit 214 assigns, to the packet received from the generation unit 216, the train ID stored in the transmission table and the current time as the transmission time, and transmits the packet to the receiver 20. The transmission unit 214 further stores the transmission time assigned to the packet and the amount of data in the transmitted packet in the transmission table.

A functional configuration of the receiver 220 of the second embodiment will now be described with reference to FIG. 12. As illustrated in FIG. 12, the receiver 220 includes the reception unit 22, a measurement unit 224, a measurement validity determination unit 232, the estimate validity determination unit 26, the estimation unit 28, and the transmission unit 30. Each functional block is implemented by the CPU 52 illustrated in FIG. 2.

The measurement unit 224 measures a measurement time for each packet train identified based on the train ID assigned to packets received from the reception unit 22 (hereinafter referred to as incoming packets). Specifically, each time an incoming packet is received, the measurement unit 224 adds information about the incoming packet to the measurement table as illustrated in FIG. 13. In the example illustrated in FIG. 13, the measurement table stores, for each incoming packet, the packet number, the train ID, and the transmission time assigned to the incoming packet, and the reception time of the incoming packet, and the amount of data in the incoming packet. The packet number of the incoming packet is the number of the packet in the packet train.

The measurement unit 224 determines whether the train ID of the current incoming packet is the same as the train ID of the immediately previous incoming packet. The train ID of the current incoming packet being the same as the train ID of the immediately previous incoming packet indicates that packets in the same packet train may continue to be received. The train ID of the current incoming packet being different from the train ID of the immediately previous incoming packet indicates that the previous incoming packet is the last packet of the immediately previous packet train and the current incoming packet is the first packet in a new packet train. The measurement unit 224 measures the measurement time using information about the immediately previous packet train stored in the measurement table. Specifically, the measurement unit 224 measures the measurement time by subtracting the reception time of the first packet from the reception time of the last packet in the immediately previous packet train.

The measurement unit 224 passes a measurement time determined to be valid by the measurement validity determination unit 232 that will be described later, among the measured measurement times, to the estimate validity determination unit 26.

The measurement validity determination unit 232 determines the measurement validity of the measurement time measured by the measurement unit 224. For example, in response to each packet of the first to last packets in a packet train being assigned with identification information indicating that it belongs to the same packet train, the measurement validity determination unit 232 determines that measurement time is valid. This determination enables avoidance of the measurement time being measured with different packet trains mixed together.

As described with reference to FIG. 6, the packet train transmitted from the transmitter 210 is received by the receiver 220 with a spread of a distribution of reception times of packets forming the packet train depending on the communication rate of the communication line 40. A small spread means a small effect of the communication rate on the measurement time. That is, the accuracy of the rate estimate estimated based on the measurement time may deteriorate. In view of the foregoing, for example, in response to, for a packet train, each inter-packet reception time interval at the receiver 220 being greater, by a predefined value or more, than the corresponding inter-packet transmission time interval at the transmitter 210, the measurement validity determination unit 232 determines that the measurement time is valid. Specifically, the measurement validity determination unit 232 calculates a difference in transmission time between each pair of consecutive packets as an inter-packet transmission time interval and a difference in reception time between each pair of consecutive packets in the same packet train. In response to, for each pair of consecutive packets in the packet train, the inter-packet reception time interval divided by the corresponding inter-packet transmission time interval being greater than or equal to a predefined threshold value $\alpha$ (where $\alpha > 1$), the measurement validity determination unit 232 determines that the measurement time is valid. The measurement validity determination unit 232 notifies the measurement unit 224 of the determination result.

Operations of the bandwidth estimation system 200 of the second embodiment will now be described. In the transmitter 210 of the second embodiment, transmitter reception processing illustrated in FIG. 7 and transmitter transmission processing illustrated in FIG. 14 are performed. In the receiver 220, bandwidth estimation processing illustrated in FIG. 15 is performed. As the transmitter transmission processing is similar to that of the first embodiment, description thereof will be omitted. In the transmitter transmission processing and the bandwidth estimation processing of the second embodiment, the same process steps as in the transmitter transmission processing (FIG. 8) and the bandwidth estimation processing (FIG. 9) of the first embodiment are assigned with the same reference numerals and description thereof will be omitted.

The transmitter reception processing will now be described with reference to FIG. 14.

At step S220 subsequent to step S20, the generation unit 216 retrieves the packet at the front of the transmission queue. At step S222, the generation unit 216 subtracts the transmission time of the last packet from the current time to calculate a transmission time interval. Subsequently, at step S224, the generation unit 216 determines whether the calculated transmission time interval is greater than a predefined value that is calculated by dividing the amount of data in the last transmitted packet by the rate estimate stored in the transmission table. If the transmission time interval is greater than the predefined value, the process flow proceeds to step S226. If the transmission time interval is less than or equal to the predefined value, the process flow proceeds to step S228.

At step S226, the generation unit 216 determines a new train ID and updates the train ID in the transmission table. Subsequently, at step S228, the transmission unit 214 assigns, to the packet retrieved at step S221, the train ID stored in the transmission table and the transmission time, and transmits the packet to the receiver 220. At step S230, the transmission unit 214 stores the transmission time assigned to the packet and an amount of data in the transmitted packet in the transmission table. Then, the process flow proceeds to step S24.

The bandwidth estimation processing will now be described with reference to FIG. 15.

At step S40, the reception unit 22 determines whether a packet transmitted from the transmitter 210 has been received. If a packet transmitted from the transmitter 210 has been received, the process flow proceeds to step S242. If not, the reception unit 22 repeats the determination step S40. At step S242, the measurement unit 224 adds information about the incoming packet to the measurement table. Subsequently, at step S244, the measurement unit 224 determines whether the train ID of this incoming packet is the same as the train ID of the immediately previous incoming packet. If the train ID of this incoming packet is the same as the train ID of the immediately previous incoming packet, the process flow returns to step S40. If the train ID of this incoming packet is different from the train ID of the immediately previous incoming packet, the process flow proceeds to S246.

At step S246, the measurement validity determination unit 232 calculates, for a packet train including the immediately previous incoming packet, a difference in transmission time between each pair of consecutive packets as an inter-packet transmission time interval and a difference in reception time between each pair of consecutive packets in the same packet train as an inter-packet reception time interval. Subsequently, at step S248, the measurement validity determination unit 232 determines, for each pair of consecutive packets in the subject packet train, whether the inter-packet reception time interval divided by the corresponding inter-packet transmission time interval is greater than or equal to the predefined threshold value α (where α>1). If, for each pair of consecutive packets in the subject packet train, the inter-packet reception time interval divided by the corresponding inter-packet transmission time interval is greater than or equal to the predefined threshold value a, the process flow proceeds to step S44. If, for at least one pair of consecutive packets in the packet train, the inter-packet reception time interval divided by the corresponding inter-packet transmission time interval is less than the predefined threshold value a, the process flow returns to step S40.

Thereafter, the process steps S44-S48 are performed in the same manner as in the first embodiment, and then the process flow returns to step S40.

As described above, in the bandwidth estimation system of the second embodiment, the receiver determines the measurement validity of the measurement time, and in response to determining that a valid estimate of the available bandwidth can be made, based on a valid measurement time within which a valid measurement can be made, estimate the available bandwidth. This can increase the validity of the bandwidth estimation.

Although the bandwidth estimation processing in the second embodiment (as illustrated in FIG. 15) has been described where the measurement validity of the measurement time based on a spread of reception time intervals is determined upon completion of reception of one packet train, it is not limited thereto. In an alternative embodiment, each time a packet is received, the transmission time interval and the reception time interval between the current and previous packets may be calculated to determine whether the reception time interval divided by the transmission time interval is greater than or equal to a. If the reception time interval divided by the transmission time interval is determined to be less than a, further processing for the current packet train may be stopped, and the bandwidth estimation processing may be restarted when the next packet train is received.

In the second embodiment, both the measurement validity of the measurement time based on the identity of the train ID and the measurement validity of the measurement time based on a spread of reception time intervals are determined. In an alternative embodiment, either the measurement validity of the measurement time based on the identity of the train ID and the measurement validity of the measurement time based on a spread of reception time intervals are determined.

Third Embodiment

A third embodiment will now be described. In the bandwidth estimation system of the third embodiment, components similar to those of the bandwidth estimation system 200 of the second embodiment are assigned with the same reference numerals and detailed description thereof will be omitted. For the functional blocks whose last two digits of the reference numerals are common between the second and third embodiments, detailed description will be omitted. The hardware configuration of each of the transmitter and the receiver of the third embodiment is the same as that of each of the transmitter 10 and receiver 20 of the first embodiment as illustrated in FIG. 2. Detailed description thereof will thus be omitted.

As illustrated in FIG. 1, the bandwidth estimation system 300 according to the third embodiment includes the transmitter 210 and a receiver 320.

A functional configuration of the receiver 320 of the third embodiment will now be described with reference to FIG. 12. As illustrated in FIG. 12, the receiver 320 includes the reception unit 22, a measurement unit 324, a measurement validity determination unit 332, an estimate validity determination unit 326, an estimation unit 328, and the transmission unit 30. Each functional block is implemented by the CPU 52 illustrated in FIG. 2.

The measurement validity determination unit 332 determines the measurement validity of the measurement time based on the identity of the train ID. Specifically, each time a packet is received, the measurement validity determination unit 332 adds an entry to a measurement table as illustrated in FIG. 16 or updates an entry in the measurement table. In the example illustrated in FIG. 16, the measurement table stores entries (train IDs), the start times of reception, the end times of reception, and measured amounts of data. The start time of reception is the time when the first packet of a packet train was received at the receiver 320, and the end time of reception is the time when the last packet of the same packet train was received at the receiver 320.

More specifically, the measurement validity determination unit 332 determines whether there is an entry that matches the train ID assigned to the incoming packet, among entries stored in the measurement table. If there is an entry that matches the train ID assigned to the incoming packet, among entries stored in the measurement table, the measurement validity determination unit 332 updates the end time of reception and the measured amount of data in the measurement table, based on the incoming packet.

Specifically, the measurement validity determination unit 332 updates the end time of reception to the reception time of the incoming packet and updates the measured amount of data to a sum of the amount of data in the incoming packet and the measured amount of data that is currently stored in the measurement table.

If there is no entry that matches the train ID, among entries stored in the measurement table, the measurement validity determination unit 332 adds a new entry to the measurement table, based on the incoming packet. Specifically, the measurement validity determination unit 332 adds, to the measurement table, the train ID assigned to the incoming packet as an entry number, the reception time of the incoming packet as each of the start time of reception and the end time of reception, 0 as the measured amount of data. This ensures measurement validity of the measurement time based on the identity of the train ID when the measurement time is measured by the measurement unit 324.

The measurement unit 324 measures the measurement time for each packet train identified based on the train ID assigned to the incoming packet received from the reception unit 22. Specifically, the measurement unit 324 measures the measurement time for the packet train corresponding to the latest entry each time the measurement table is updated (excluding addition of entries) based on an incoming packet.

Specifically, the measurement unit 324 measures the measurement time by subtracting the start time of reception from the end time of reception in the latest entry stored in the measurement table. If the measurement time is determined not to be valid by the estimate validity determination unit 326 described later, the measurement unit 324 calculates an integrated measurement time by adding the measurement time for the previous packet train to the measurement time for the packet train corresponding to the latest entry.

If the measurement time for a first packet train is less than the threshold time β, the estimate validity determination unit 326 compares an integrated measurement time, which an integration of the measurement times for a plurality of consecutive packet trains, with the threshold time β to determine whether a valid estimate of the available bandwidth can be made. Specifically, if determining that the measurement time for the first packet train measured by the measurement unit 324 is less than the threshold time, the estimate validity determination unit 326 causes the measurement unit 324 to calculate an integrated measurement time by adding the measurement time for the subsequent packet train to the measurement time for the first packet train. The estimate validity determination unit 326 then determines whether the integrated measurement time is greater than or equal to the threshold time β. The estimate validity determination unit 326 causes the measurement unit 324 to calculate the integrated measurement time until the integrated measurement time is equal to or greater than the threshold time β.

For example, as illustrated in FIG. 17, if the measurement time T1 for the packet train 1 is less than the threshold time β, then it is determined, at this time, that a valid estimate of the bandwidth cannot be made for the measurement time T1. If the measurement time T2 for the packet train 2 is also less than the threshold time β, then it is determined that a valid estimate of the bandwidth cannot be made for the measurement time T2 alone. However, if the integrated measurement time (T1+T2) is greater than or equal to β, then it is determined that a valid estimate of the bandwidth can be made for the integrated measurement time (T1+T2).

In response to the estimate validity determination unit 326 determining that a valid estimate of the available bandwidth can be made, the estimation unit 328 estimates the available bandwidth based on the total amount of data and the integrated measurement time for a consolidated plurality of packet trains.

Specifically, the estimation unit 328 estimates the rate estimate that is an estimate of the available bandwidth, by acquiring a measured amount of data in each of a consolidated plurality of packet trains from the measurement table and dividing a sum of the measured amounts of data by the integrated measurement time.

Operations of the bandwidth estimation system 300 of the third embodiment will now be described. In the transmitter 210 of the third embodiment, transmitter reception processing illustrated in FIG. 7 and transmitter transmission processing illustrated in FIG. 14 are performed. In the receiver 320, bandwidth estimation processing illustrated in FIG. 18 is performed. As the transmitter transmission processing and the transmitter reception processing are similar to those of the second embodiment, description thereof will be omitted. In the bandwidth estimation processing of the third embodiment, the same process steps as in the bandwidth estimation processing (FIG. 9) of the first embodiment are assigned with the same reference numerals and description thereof will be omitted.

The bandwidth estimation processing in the third embodiment will now be described with reference to FIG. 18.

At step S340 subsequent to step S40, the measurement validity determination unit 332 sets a variable i, which indicates the train ID of the packet train to which the incoming packet belongs, to the train ID of the packet train to which the incoming packet belongs. Subsequently, at step S342, the measurement validity determination unit 332 determines whether an entry i that matches the valuable i is stored in the measurement table. If the entry i is stored, the process flow proceeds to step S346. If not, the process flow proceeds to step S344. The packet train assigned with i as the train ID is denoted as "packet train i" in the following.

At step S344, the measurement validity determination unit 332 adds the entry number i, the reception time of the incoming packet as each of the start time of reception and the end time of reception, and 0 as the measured amount of data, to the measurement table. Then, the process flow returns to step S40. At step S346, the measurement validity determination unit 332 updates, for the entry i, the end time of reception to the reception time of the incoming packet, the measured amount of data to the current amount of data stored in the measurement table plus an amount of data in the incoming packet.

Subsequently, at step S348, the measurement unit 324 sets a variable j, which indicates the train ID of the earliest packet train among the packet trains to be consolidated, to i. At step S350, the measurement unit 324 calculates an integrated measurement time by summing the measurement times for the packet trains j to i. At step S352, the estimate validity determination unit 326 determines whether the integrated measurement time calculated at step S350 is greater than or equal to the threshold time β. If the integrated measurement time is greater than or equal to the threshold time β, the process flow proceeds to step S358. If the integrated measurement time is less than the threshold time β, the process flow proceeds to S354.

At step S354, the estimate validity determination unit 326 determines whether j is the train ID of the first received packet train. If j is the train ID of the first received packet train, the process flow returns to step S40. If j is not the train ID of the first received packet train, the process flow returns to step S356. At step S356, the estimate validity determination unit 326 updates j to the train ID of the immediately previous received packet train, and the process flow returns to step S350. At step S350, the estimate validity determination unit 326 causes the measurement unit 324 to calculate the integrated measurement time.

At step S358, the estimation unit 328 estimates a rate estimate by dividing a sum of measured amounts of data in the packet trains j to i by the integrated measurement time calculated at step S350. Then, the transmission unit 30 transmits the rate estimate to the transmitter 210. Thereafter, the process flow returns to step S40.

As described above, in the bandwidth estimation system of the third embodiment, in a case where the receiver cannot make a valid estimate of the available bandwidth with the measurement time for a single packet train, the receiver consolidates a plurality of packet trains to estimate the available bandwidth. With this configuration, even in a case where the measurement time for a single packet train is less than the threshold time due to the performance of the receiver or the characteristics of the communication line, increasing the measurement time allows the available bandwidth to be estimated. In addition, the number of packets in one packet train does not need to be increased such that the measurement time is greater than or equal to the threshold time, thus avoiding an increase in packet train data amount.

Fourth Embodiment

A fourth embodiment will now be described. In the bandwidth estimation system of the fourth embodiment, components similar to those of the bandwidth estimation system 300 of the third embodiment are assigned with the same reference numerals and detailed description thereof will be omitted. For the functional blocks whose last two digits of the reference numerals are common between the third and fourth embodiments, detailed description will be omitted. The hardware configuration of each of the transmitter and the receiver of the fourth embodiment is the same as that of each of the transmitter 10 and receiver 20 of the first embodiment as illustrated in FIG. 2. Detailed description thereof will thus be omitted.

As illustrated in FIG. 1, the bandwidth estimation system 400 according to the fourth embodiment includes the transmitter 210 and a receiver 420.

A functional configuration of the receiver 420 of the fourth embodiment will now be described with reference to FIG. 12. As illustrated in FIG. 12, the receiver 420 includes the reception unit 22, the measurement unit 324, the measurement validity determination unit 332, an estimate validity determination unit 426, the estimation unit 328, and the transmission unit 30. Each functional block is implemented by the CPU 52 illustrated in FIG. 2.

The third embodiment has been described, where it is determined whether a valid estimate of the bandwidth can be made, based on whether the integrated measurement time, which is a sum of the measurement times for the plurality of packet trains, is greater than or equal to the threshold time β. In such an embodiment, the packet trains used to estimate the available bandwidth may include an old packet train due to a time required for the communication rate of the communication line 40 vary. If the available bandwidth is estimated using a plurality of packet trains including such an old packet train, the estimation accuracy may deteriorate.

In the present embodiment, like the estimate validity determination unit 326 of the third embodiment, the estimate validity determination unit 426 determines the validity of the integrated measurement time that is a sum of the measurement times for a plurality of packet trains. In response to a required measurement time from reception of the first (or earliest) packet to reception of the last packet of the consolidated plurality of packet trains being within a predefined upper limit, the estimate validity determination unit 426 determines that a valid estimate of the available bandwidth can be made.

For example, as illustrated in FIG. 19, it is supposed that the integrated measurement time (T1+T2) is greater than or equal to the threshold time β, where T1 is the measurement time for the packet train 1 and T2 is the measurement time for the packet train 2. In this case, the estimate validity determination unit 426 calculates the required measurement time T(1-2) by subtracting the reception time of the first packet of the packet train 1 from the reception time of the last packet of the packet train 2. In a case where this required measurement time T(1-2) exceeds the upper limit γ, the estimate validity determination unit 426 determines that a valid estimate of the available bandwidth cannot be made even if the integrated measurement time (T1+T2) is greater than or equal to the threshold time β.

The upper limit γ is predefined based on the characteristics of the communication line. For example, as illustrated in FIG. 20, the upper limit γ may be defined as a time required for the communication rate to vary by a predefined value or more.

Operations of the bandwidth estimation system 400 of the fourth embodiment will now be described. In the transmitter 210 of the fourth embodiment, transmitter reception processing illustrated in FIG. 7 and transmitter transmission processing illustrated in FIG. 14 are performed. In the receiver 420, bandwidth estimation processing illustrated in FIG. 21 is performed. As the transmitter transmission processing and the transmitter reception processing are similar to those of the second embodiment, description thereof will be omitted. In the bandwidth estimation processing of the fourth embodiment, the same process steps as in the bandwidth estimation processing (FIG. 18) of the third embodiment are assigned with the same reference numerals and description thereof will be omitted.

If the answer is YES at step S352, the process flow proceeds to step S440. At step S440, the estimate validity determination unit 426 calculates a required measurement time T(j-i) by subtracting the reception time of the first packet in the packet train j from the reception time of the last packet in the packet train i. Subsequently, at step S442, the estimate validity determination unit 426 determines whether the required measurement time T(j-i) calculated at step S440 is less than or equal to the predefined upper limit γ. If T(j-i)≤γ, the process flow proceeds step S358. If T(j-i)>γ, the process flow proceeds step S40.

As described above, in the bandwidth estimation system of the fourth embodiment, the receiver determines that a valid estimate of the bandwidth cannot be made in response to a sum of measurement times for a plurality of packet trains being calculated and a required measurement time for the plurality of packet trains exceeding the upper limit. This avoids inclusion of an old packet train due to a time required for the communication rate of the communication line 40 vary, thereby suppressing deterioration of the estimation accuracy.

The above embodiments may be implemented in combination as appropriate.

Each of the above embodiments has been described, where the bandwidth estimation device operates on the receiver, but it is not limited thereto. In an alternative embodiment, for example, the estimation unit may be incorporated in the transmitter. In such an embodiment, the measurement time that is determined to be valid by the estimate validity determination unit may be transmitted from the receiver to the transmitter. In another alternative embodiment, the estimate validity determination unit and the estimation unit may be incorporated in the transmitter. In such an embodiment, the measurement time measured by the measurement unit may be transmitted from the receiver to the transmitter. In still another alternative embodiment, the measurement unit, the estimate validity determination unit, and the estimation unit may be incorporated in the transmitter. In such an embodiment, the reception time of each packet received by the reception unit may be transmitted from the receiver to the transmitter.

Various processing performed by the CPU reading the software (program) in the embodiments may be performed by various processors other than the CPU. Examples of such processors include a programmable logic device (PLD), such as a field-programmable gate array (FPGA), whose circuit configuration can be changed after manufacture, and a dedicated electric circuit, such as an application specific integrated circuit (ASIC), which is a processor having a circuit configuration specifically designed for performing specific processing. The various processing may be performed by one of these various processors or by two or more processors of the same type or different types in combination (e.g., a plurality of FPGAs, a combination of a CPU and an FPGA, etc.). More specifically, the hardware structure of these various processors is an electric circuit acquired by combining circuit elements such as semiconductor elements.

Each of the embodiments has been described, where the transmitter program and the bandwidth estimation program are pre-stored (installed) in their respective storage units, but is not limited thereto. The programs may be stored in a non-transitory tangible storage medium, such as a Compact Disk Read Only Memory (CD-ROM), a Digital Versatile Disk Read Only Memory (DVD-ROM), or a Universal Serial Bus (USB) memory. The programs may be downloaded from an external device via a network.

What is claimed is:

1. A bandwidth estimation device comprising:
   a non-transitory memory storing one or more computer programs; and
   a processor executing the one or more computer programs to:
   measure a measurement time from reception by a receiver of a first packet of a packet train including a plurality of packets that are sequentially transmitted from a transmitter via a communication line to reception by the receiver of a last packet of the packet train;
   compare the measurement time with a threshold time predefined based on performance of the receiver or characteristics of the communication line to determine whether a valid estimate of an available bandwidth of the communication line can be made;
   in response to determining that a valid estimate of the available bandwidth can be made, estimate the available bandwidth of the communication line based on an amount of data in the packet train and the measurement time;
   compare, in response to the measurement time for a first packet train being less than the threshold time, an integrated measurement time that is an integration of the measurement times for a plurality of consecutive packet trains with the threshold time to determine whether a valid estimate of the available bandwidth can be made; and
   estimate, in response to determining that a valid estimate of the available bandwidth can be made, the available bandwidth based on a total amount of data in a consolidated plurality of packet trains and the integrated measurement time,
   wherein
   the transmitter sequentially transmits the plurality of packets of the packet train at a higher rate than a communication rate that is the estimate of the available bandwidth of the communication line.

2. The bandwidth estimation device according to claim 1, wherein
   the processor further executes the one or more computer programs to determine, in response to the measurement time being greater than or equal to the threshold time that is greater than or equal to a predefined multiple of a resolution of processing time at the receiver, that a valid estimate of the available bandwidth can be made.

3. The bandwidth estimation device according to claim 1, wherein
   the processor further executes the one or more computer programs to determine, in response to the measurement time being greater than or equal to the threshold time that is a time period per interrupt cycle, in which interrupt processing is performed on the packets received at the receiver, plus a margin, that a valid estimate of the available bandwidth can be made.

4. The bandwidth estimation device according to claim 1, wherein
   the processor further executes the one or more computer programs to determine, in response to the measurement time being greater than or equal to the threshold time that is a time period per burst cycle, in which burst traffic occurs on the communication line, plus a margin, that a valid estimate of the available bandwidth can be made.

5. The bandwidth estimation device according to claim 1, wherein
   the processor further executes the one or more computer programs to: determine measurement validity of the measurement time; and determine whether a valid estimate of the available bandwidth can be made based on a valid measurement time within which a valid measurement can be made.

6. The bandwidth estimation device according to claim 5, wherein
   the processor further executes the one or more computer programs to determine, in response to each of the first to the last packets of the packet train being assigned with identification information indicating that it belongs to a same packet train, that the measurement time is valid.

7. The bandwidth estimation device according to claim 5, wherein
   each of the plurality of packets included in the packet train is assigned with a transmission time indicating when the packet was transmitted from the transmitter, and
   the processor further executes the one or more computer programs to determine, in response to, for each pair of consecutive packets included in the packet train, an inter-packet reception time interval at the receiver being greater, by a predefined value or more, than a corresponding inter-packet transmission time interval at the transmitter, that the measurement time is valid.

8. The bandwidth estimation device according to claim 1, wherein
   the processor further executes the one or more computer programs to determine, in response to a time period from reception of a first packet to reception of a last packet of the consolidated plurality of packet trains being within a predefined upper limit, that a valid estimate of the available bandwidth can be made.

9. A bandwidth estimation method comprising:
   measuring a measurement time from reception by a receiver of a first packet of a packet train including a plurality of packets that are sequentially transmitted from a transmitter via a communication line to reception by the receiver of a last packet of the packet train;
   comparing the measurement time with a threshold time predefined based on performance of the receiver or characteristics of the communication line to determine whether a valid estimate of an available bandwidth of the communication line can be made;
   in response to determining that a valid estimate of the available bandwidth can be made, estimating the available bandwidth of the communication line based on an amount of data in the packet train and the measurement time, comparing, in response to the measurement time for a first packet train being less than the threshold time, an integrated measurement time that is an integration of the measurement times for a plurality of consecutive packet trains with the threshold time to determine whether a valid estimate of the available bandwidth can be made; and estimating, in response to determining that a valid estimate of the available bandwidth can be made, the available bandwidth based on a total amount of data in a consolidated plurality of packet trains and the integrated measurement time, wherein the transmitter sequentially transmits the plurality of packets of the packet train at a higher rate than a communication rate that is the estimate of the available bandwidth of the communication line.

10. A non-transitory computer readable storage medium having instructions stored thereon that, when executed by a computer, cause the computer to:

measure a measurement time from reception by a receiver of a first packet of a packet train including a plurality of packets that are sequentially transmitted from a transmitter via a communication line to reception by the receiver of a last packet of the packet train;

compare the measurement time with a threshold time predefined based on performance of the receiver or characteristics of the communication line to determine whether a valid estimate of an available bandwidth of the communication line can be made;

in response to determining that a valid estimate of the available bandwidth can be made, estimate the available bandwidth of the communication line based on an amount of data in the packet train and the measurement time;

compare, in response to the measurement time for a first packet train being less than the threshold time, an integrated measurement time that is an integration of the measurement times for a plurality of consecutive packet trains with the threshold time to determine whether a valid estimate of the available bandwidth can be made; and estimate, in response to determining that a valid estimate of the available bandwidth can be made, the available bandwidth based on a total amount of data in a consolidated plurality of packet trains and the integrated measurement time, wherein the transmitter sequentially transmits the plurality of packets of the packet train at a higher rate than a communication rate that is the estimate of the available bandwidth of the communication line.

11. The bandwidth estimation device according to claim 1, wherein the packet train is generated by sequentially retrieving a packet that has arrived in a transmission queue.

* * * * *